United States Patent [19]
Stoltz

[11] Patent Number: 5,212,555
[45] Date of Patent: May 18, 1993

[54] IMAGE CAPTURE WITH SPATIAL LIGHT MODULATOR AND SINGLE-CELL PHOTOSENSOR

[75] Inventor: Richard A. Stoltz, Plano, Tex.
[73] Assignee: Texas Instruments Incorporated, Dallas, Tex.
[21] Appl. No.: 809,607
[22] Filed: Dec. 17, 1991
[51] Int. Cl.[5] .................. H04N 3/08; H04N 9/10
[52] U.S. Cl. .................. 358/206; 358/233; 358/225; 358/63; 358/55
[58] Field of Search .................. 358/206, 225, 63, 55, 358/233, 199, 209

[56] References Cited

U.S. PATENT DOCUMENTS

| | | | |
|---|---|---|---|
| 3,701,586 | 10/1972 | Goetz | 358/233 X |
| 3,989,890 | 11/1976 | Nathanson et al. | 358/233 |
| 4,589,030 | 5/1986 | Kley | 358/225 |
| 4,601,537 | 7/1986 | Saccocio | 358/225 X |
| 4,603,356 | 7/1986 | Bates | 358/225 |
| 4,775,204 | 10/1988 | Setani | 358/233 X |
| 4,833,540 | 5/1989 | Kokubu | 358/225 |
| 5,030,985 | 7/1991 | Bryant | 358/225 X |
| 5,061,049 | 10/1991 | Hornbeck | 358/206 X |

Primary Examiner—James J. Groody
Assistant Examiner—Mark R. Powell
Attorney, Agent, or Firm—Julie L. Reed; James C. Kesterson; Richard L. Donaldson

[57] ABSTRACT

An apparatus and method for capturing an image, using a spatial light modulator (SLM) 11 and a single-element sensor 15. The SLM 11 is an array of individually switchable pixel elements, which reflect light toward the sensor if switched to an "on" position. As each pixel element is switched on, light from that pixel element is directed to the sensor 15. For each pixel element, the sensor 15 generates a signal proportional to the light associated with that pixel element, the result being a series of signals representing at least one image frame. The process may be repeated for a number of image frames for generating moving pictures.

17 Claims, 3 Drawing Sheets

IMAGE CAPTURE WITH SPATIAL LIGHT MODULATOR AND SINGLE-CELL PHOTOSENSOR

RELATED PATENT APPLICATIONS

The following patent applications are related to the present application, and are incorporated by reference herein:

U.S. Ser. No. 725,231, "Apparatus and Method for Digitized Video System"

U.S. Ser. No. 756,007, "DMD Display System Controller"

TECHNICAL FIELD OF THE INVENTION

This invention relates to cameras and other image capturing devices, and more particularly to using a spatial light modulator and a single-cell sensor to generate a pixel-by-pixel signal.

BACKGROUND OF THE INVENTION

Spatial light modulators (SLMs) are devices used to control the distribution of light in an optical system. SLMs are typically configured as one or two-dimensional arrays of individually addressable optical elements, representing pixels of an image. These elements modify either the amplitude or the phase of the light distribution within the optical system.

SLMs can be divided into various types, including an electro-optic, magneto-optic, liquid crystal, and deformable mirror devices. These different types may be further characterized according to whether they are suitable for amplitude or phase modulation or both.

SLMs and their applications are described in the patents and patent applications listed in the "Related Patents" section above. Many applications involve using SLMs in display systems, where a SLM optics unit replaces a raster scan unit. These are "image generation" systems, in which the SLM receives data in the form of electrical signals for the purpose of determining how light is to be reflected by its pixel elements to a display screen, printer, or other such equipment. Thus, SLMs are traditionally used to transform an electrical signal to light patterns, and thereby generate an image.

Conventional means for capturing an image as an electronic signal, as opposed to recreating an image from a signal, do not involve the use of SLMs. In many applications the light receiving device is a photosensor array, in which an array of photosensor elements is used to differentiate pixels of the image. Each element of the array generates a signal corresponding to a pixel point of the image. This signal can be easily transmitted, digitized, or otherwise processed for reconstitution into an image at a desired time and place. A problem with such systems is that the sensor arrays are relatively expensive. A need exists for an image capture system that provides a less expensive alternative to photosensor-based systems.

SUMMARY OF THE INVENTION

One aspect of the invention is an optics unit for capturing an image. A collecting lens directs image-reflected light to a spatial light modulator (SLM). The SLM is comprised of an array of reflective pixel elements, which are individually addressable and switchable, such that a series of pixel-reflected light beams are reflected from the SLM as different pixels are switched. A defocussing lens focussing said pixel-reflected light onto a single-cell photosensor. The photosensor detects each pixel-reflected light beam and generates a signal proportional to the intensity of said pixel-reflected light. The SLM is in communication with timing means for controlling the switching of its pixel elements, such that a number of pixel elements representing an image frame are addressed in series.

The optics unit may be used in digital or analog systems, for printing or display applications with equipment that is remote or in-line with the optics unit. For digital applications, the signal is digitized and may be processed or stored.

An enhancement of the invention is addressing more than one pixel element in parallel and detecting a pixel-reflected light beam with a sensor associated with each currently addressed pixel element. Another enhancement is using color-sensitive sensors to generate a signal representing color.

A technical advantage of the invention is that a single-cell sensor may be used to generate the electrical signal instead of an array of sensor elements. The SLM provides differentiation among pixel elements, and the sensor need only sense one pixel at a time. The result is an electrical signal that may be easily transmitted or processed.

DETAILED DESCRIPTION OF THE INVENTION

For "image capture" applications, a spatial light modulator (SLM) could receive light from an image incident on its pixel elements as input. Then, in one type of system, the SLM would be used with various lenses and other optical devices to receive the light and redirect it a display screen, printer drum, or other image generating device. However, a limitation of such systems is that the signal generated by the SLM is in the form of pixel light beams which must be optically transmitted. In the image capture system described herein the SLM is used to generate an electronic image that may be easily transmitted, processed, or stored.

Figure 1:
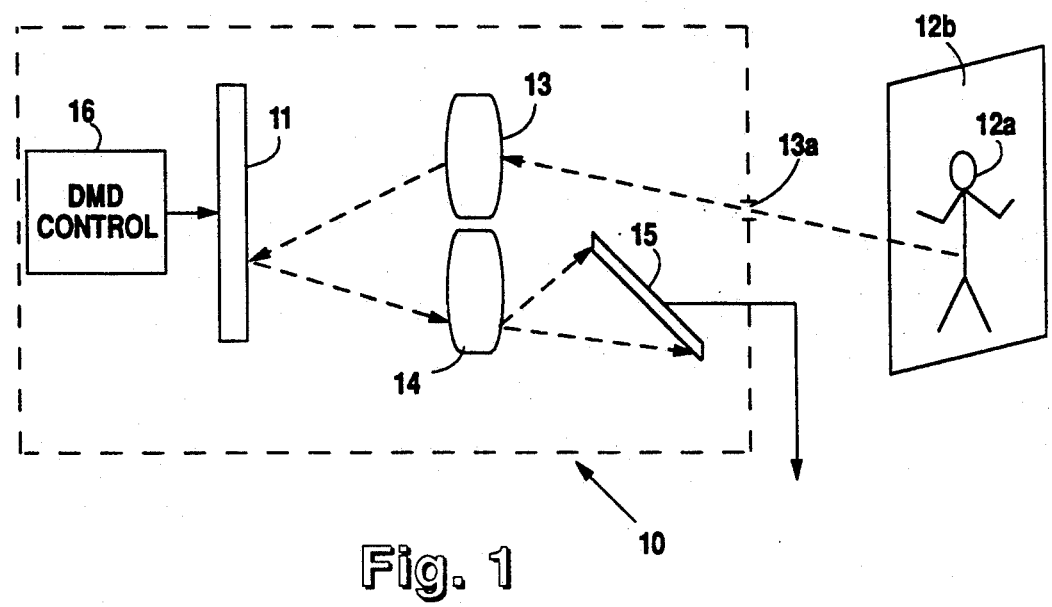
FIG. 1 illustrates a mono-color optics unit for capturing an image.

FIG. 1 illustrates an optics unit 10 for an image capturing system, which uses a spatial light modulator (SLM) 11 to differentiate pixels from an image 12a and a single-cell sensor 15 to generate an electrical signal. As explained below in connection with FIG. 3, optics unit 10 could be used with any image capturing equipment, such as television or still cameras, infrared detection systems, facsimile equipment, and xerographic equipment. The embodiment of FIG. 1 is for black and white images; a color image embodiment is explained below in connection with FIG. 4.

An image 12a reflects light from its environment. This light is received by collecting lens 13. Lens 13 may be any type of optical device that captures light reflected from image 12a and focuses it on SML 11. Lens 13 of FIG. 1 is a simplified version of a means for focussing light from image 12a onto SLM 11; in more complicated means, optical devices such as mirrors and additional lenses may be used for this purpose using known optical techniques. Ideally, collecting lens means 13 maximizes the light available from the image. Photomultipliers might also be used. In camera applications, such as shown in FIG. 1, the collecting means will also include a pinhole 13a.

The arrangement of lens 13 and SLM 11 is such that an image frame 12b illuminates the surface of SLM 11. Thus, an upper edge of image frame 12b will fall at an upper edge of SLM 11, or vice versa for an inverted image.

The description herein is in terms of implementing SLM 11 with a deformable mirror device (DMD). However, the invention is not limited to the use of DMDs for SLM 11 and may be implemented with other types of SLMs. A common characteristic of a suitable SLM device is the ability to reflect light from pixel elements that are individually addressable.

DMD 11 is a deformable mirror device (DMD), which is used to reflect points of light from image 12a as pixels, on a pixel by pixel basis. As explained in the background of this patent application, DMDs are a type of spatial light modulator having an array of reflective pixel elements. Each reflective element represents a pixel element, and each of which is electronically addressable and capable of separate mechanical movement in response to an electrical input. For display, each pixel element is switched so that it is tilted one of a number of positions.

An example is the DMD device manufactured by Texas Instruments, Inc., in which each pixel element is associated with a memory cell and may be individually addressed. Other DMD devices may be used, and are characterized by various types of architectures. The mirror elements may be moveable by means of torsion-beam or cantilever supports, or may be elastomer or membrane designs. Addressing may be achieved by an e-beam input, optically, or by integrated circuits. Various types of DMD devices and methods of addressing them, are described in the references cited in the background section of this patent application.

Figure 2A:
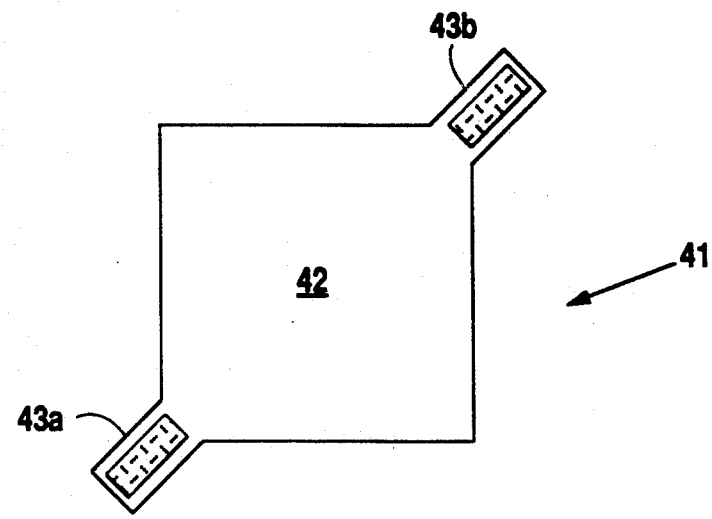
FIG. 2A and 2B illustrate a single pixel element of a deformable mirror device.
Figure 2B:
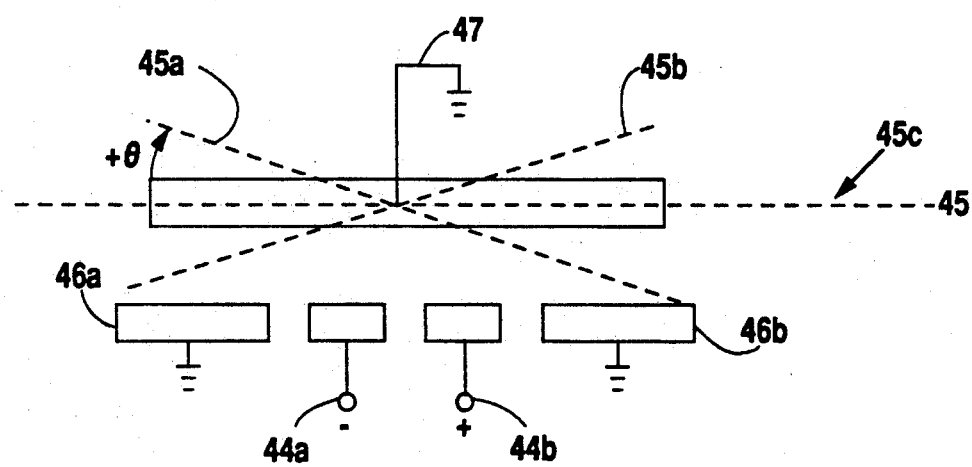

FIGS. 2A and 2B illustrate a movable pixel element 41, such those that comprise the pixel array of DMD 11. When pixel element 41 is in one position, the light incident on DMD 11 is redirected toward lens 14 and hence to sensor 15. When element pixel 41 is in another position, light is not directed to lens 14 and sensor 15 will not receive light from that pixel.

The pixel element 41 of FIGS. 2A and 2B is of a torsion-beam design, where a thick reflective beam, i.e., mirror 42, is suspended over an air gap and connected between two rigid supports by two thin torsion hinges 43a and 43b that are under tension. When an address electrode 44a or 44b, underlying one-half of mirror 42, is energized, the torsion hinges 43a and 43b are twisted and mirror 42 rotates about the axis of the two hinges 43a and 43b.

The movement of mirror 42 is shown in FIG. 2B. Mirror 42 moves about an axis from the position shown by the dotted line 45a to the position shown by the dotted line 45b relative to the plane surface 45c of mirror 42. In an "on" position, the edge of mirror 42 touches landing electrode 46a. Mirror 42 is moved to the "on" position by applying the proper voltages to address electrodes 44a and 44b. The differential bias is applied to mirror 42 through electrode 47. If an opposite voltage is applied to electrodes 44a and 44b, then mirror 42 will rotate to the position represented by the dotted line 45b and directs the light elsewhere.

The torsion-beam pixel of FIGS. 2A and 2B is only one type of pixel architecture, and many other architectures are possible. These are distinguished by characteristics such as their deformation mode, pixel shape, and the hinge support architecture. However, for purposes of the invention herein, any sort of architecture is satisfactory so long as each pixel element is capable of independent movement.

Referring again to FIG. 1, the pixel element array of DMD 11 corresponds to image frame 12b. DMD 11 is addressed pixel by pixel, such that only one pixel reflects light toward lens 14 during a given pixel-time. In the example of this description, DMD 11 is a 640×480 pixel array to match the rows and columns of the sampled incoming data. Thus, to display a 640×480 pixel image, DMD 11 is addressed 640×480 times. However, the concepts described herein could be implemented with any size array.

DMD controller 16 controls the addressing and switching of the pixel elements of DMD 11. DMD controller 16 also includes a means for generating timing signals, so that if desired, the operation of DMD 11 will permit real-time or near real-time image capture. U.S. Pat. Ser. No. 725,231, "Apparatus and Method for Digitized Video System," describes a method of addressing rows of a DMD. Using this method, controller 16 includes a decoder that receives a row address and decodes the address to select the desired row. Similar means may be used to select the column of a pixel to be addressed. If pixels are to be addressed on a column-by-column, row-by-row basis, simple position-shifting techniques may be used to enhance speed of operation.

The pixel-reflected light from DMD 11 is directed to defocussing lens 14. Lens 14 is any sort of optical device suitable for receiving light reflected from any pixel element of DMD and directing it to sensor 15. Ideally, lens 14 defocusses the light reflected from the currently selected pixel so that the light covers the entire surface of sensor 15 and maximum brightness is achieved.

Optical sensor 15 is any type of device for converting light energy into electrical energy. Typically, sensor 15 is a photoelectric device that generates a signal whose amplitude is proportional to the intensity of the sensed light. This proportionality may have any degree of sensitivity, upward from the basic alternative of light or dark. Depending on the light that illuminates DMD 11, sensor 15 is designed for that particular type of light, i.e., visible light, infrared radiation, or ultraviolet radiation. An advantage of the invention is that sensor 15 may be a single photo-cell or sensing element, rather than an array, because it receives light from only one pixel element of DMD 11 at a time. Other optical transducers, such as thermal detectors might also be used.

In operation, sensor 15 detects the light reflected from the pixel element of DMD 11 currently being addressed. If image 10 is dark at the point corresponding to that pixel element, no light is reflected by DMD 11 and sensor 15 generates a signal representing the absence of light. In this manner, DMD 11 is addressed pixel by pixel. All pixels other than the pixel currently being addressed are in an "off" position, such that they do not reflect light to lens 14. Each pixel is addressed in a predetermined sequence until all pixels of an image frame 12a have been addressed. For moving pictures, a series of frames are addressed.

Figure 3:
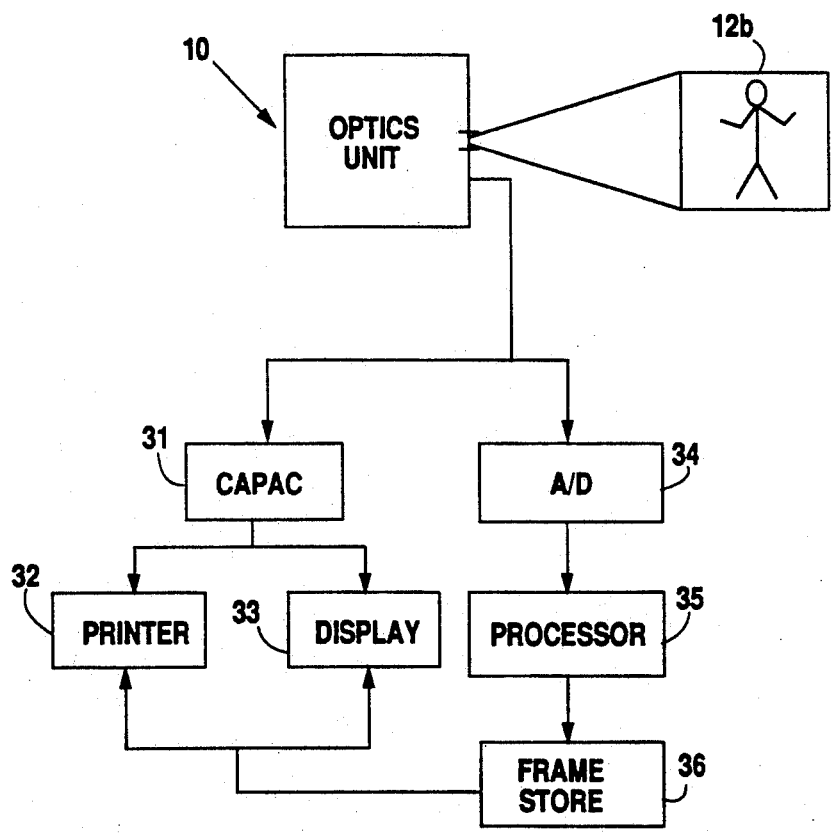
FIG. 3 illustrates system components of an image capturing system.

FIG. 3 illustrates various system components that may be used with optics unit 10 to produce hardcopy or display images. An advantage of the invention is that the signal generated by sensor 15 may be used either in-line or may be transmitted for use at a remote location.

For analog operation, the signal generated by sensor 15 may be input to capacitor circuitry 31, for generating a signal that looks like a conventional analog image signal. This signal may be delivered to image generating equipment, such as a printer 32 or a display 33.

For digital applications, sensor 15 is in communication with an analog to digital converter 34. Each pixel is then represented by a digital code representing its intensity. This data may then be processed by processor 35, stored in memory 36, or further transmitted for display or printing. The processing performed by processor 35 may include the formation of image frames that are stored in a frame memory 36. It may also include known methods of image processing to produce an image with desired characteristics.

For applications of optics unit 10 that involve generation of moving pictures, an important consideration for real-time operation is the ability of the human eye to integrate pixel elements and to avoid a perception of flicker as pixel elements switch on and off. Ideally, the address and switch period for each pixel element of DMD 11 is minimized so that an entire frame can be captured in a period that is short enough to provide a viewer with a coherent image of a series of frames. Thus, each new pixel element of DMD 11 should be addressed and switched within these constraints. By "real-time" is meant that the generation of a signal by sensor 15 is accomplished at substantially a rate that will permit the captured image to move at the same rate as its real world movement, with whatever delays are caused by the practical constraints of electronic circuitry. If it takes $10 \times 10^{-6}$ seconds to address a pixel element of DMD 11, and the image resolution is to be $160 \times 120$ pixels, it would take $10 \times 10^{-6} \times 160 \times 120$ seconds to sense an entire image frame. This is about 0.2 seconds per frame, which complies with the eye's need for at least 5 frames per second (0.2 seconds per frame). Either faster DMDs or multiple sensors 15 can be used to provide better resolution at the same operating speed.

Figure 4:
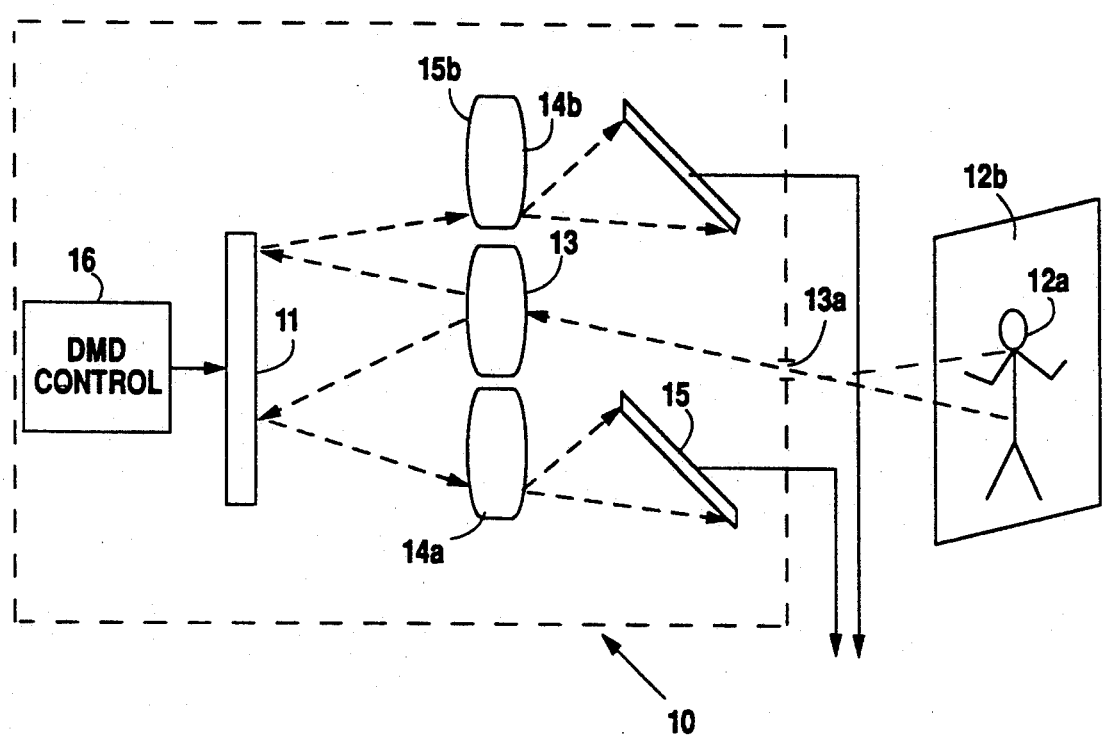
FIG. 4 illustrates a multiple sensor embodiment for increasing operating speed.

FIG. 4 illustrates another embodiment of the invention for increasing operating speed with a given resolution or for increasing resolution for a given operating speed. Two pixel elements of DMD 11 are addressed at one time, and the light directed to two different sensors 15a and 15b. Different tilt positions of the pixel elements, as shown in FIG. 2B, could be used to direct light to sensors 15a and 15b without interference. A signal from each sensor 15a and 15b is output in parallel, which permits an image to be generated twice as quickly.

In addition to the embodiment of FIG. 4, other embodiments of the invention may use more than one sensor 15, with light being directed to each using mirrors and lenses and known focussing techniques. As another example, 16 sensors 15 with different groups of mirrors for directing light to the different sensors could provide a resolution of $640 \times 480$ pixels at a speed of about 0.2 frames per second.

Figure 5:
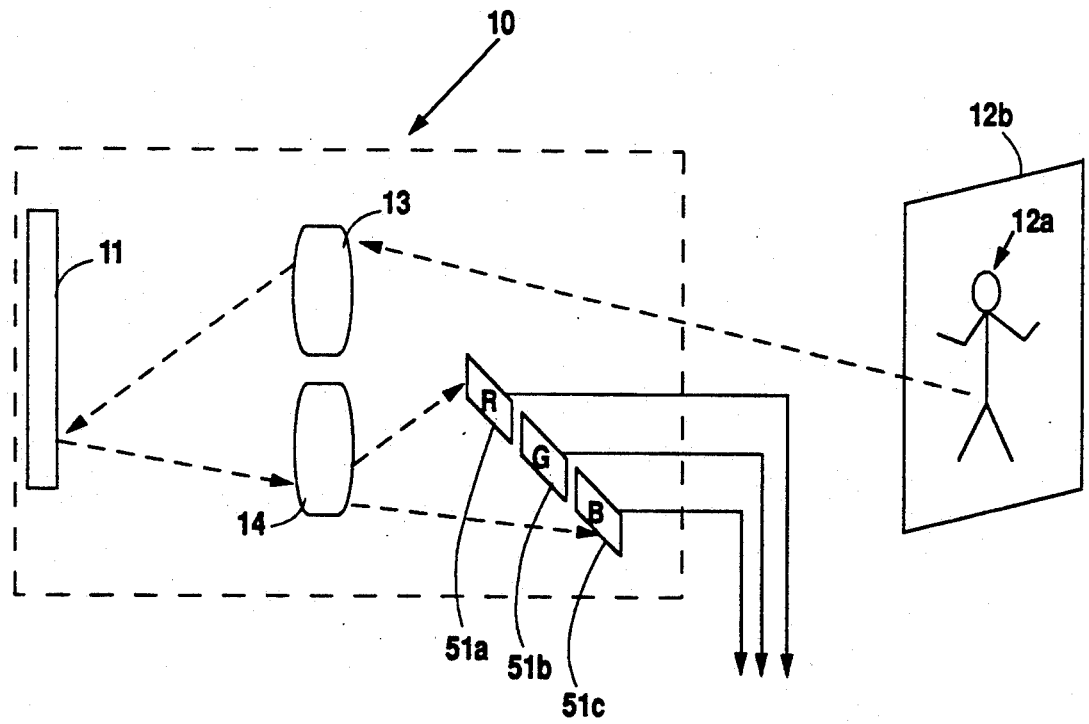
FIG. 5 illustrates a multi-color optics unit for capturing an image.

FIG. 5 illustrates an alternative embodiment of optics unit 10, for providing a color image. In this embodiment, sensor 15 is replaced by a set of color-sensitive sensors 51a–51c. Typically, the sensed colors are the three primary colors — red, green, and blue. Light from lens 14 is defocussed to cover all sensors 51a–51c, which are arranged in close proximity.

Alternatively, optical devices such as mirrors may be used to direct light on a special path to each of the sensors 51a–51c from DMD 11. Each sensor 51a–51c generates a signal representing a different color from image 12b. These signals are output in parallel for analog or digital applications as explained above.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optics unit for capturing an image, comprising:
   a means for directing image-reflected light to a spatial light modulator;
   a spatial light modulator (SLM) comprised of an array of reflective pixel elements, which are individually addressable and switchable, such that a series of pixel-reflected light beams are reflected from said SLM as different pixels are switched;
   a control circuit for addressing and switching said SLM;
   a means for focussing said pixel-reflected light to a photosensor; and
   a photosensor for detecting a single pixel-reflected light beam and for generating an electrical signal proportional to the intensity of said pixel-reflected light.

2. The optics unit of claim 1, and further comprising a plurality of sensors, each for detecting a beam of pixel-reflected light from a different pixel element of said SLM.

3. The optics unit of claim 1, where said sensor is color-sensitive.

4. The optics unit of claim 1, and further comprising a plurality of color-sensitive sensors for detecting the same pixel-reflected beam.

5. The optics unit of claim 1, and further comprising an analog to digital converter for converting said electrical signal to a series of digital codes.

6. The optics unit of claim 1, and further comprising a capacitor circuit for transforming said electrical signal into an analog signal usable by conventional image generating equipment.

7. The optics unit of claim 1, and further comprising timing means for switching said SLM, such that a number of pixel elements representing an image frame are addressed in series.

8. The optics unit of claim 1, wherein said SLM is a deformable mirror device.

9. A method of using a spatial light modulator and at least one single-cell sensor to capture an image in the form of an electrical signal, comprising the steps of:
   directing image-reflected light from an image to a spatial light modulator (SLM);
   switching a pixel element of said SLM to an on position, such that said image-reflected light is reflected by said pixel element as a pixel-reflected beam;

focussing said pixel-reflected beam onto a single-cell photosensor;

detecting said pixel-reflected beam with said single-cell photosensor;

generating an electrical signal proportional to said pixel-reflected light, using the output of said sensor; and repeating said switching and detecting steps for a series of said pixel elements until a number of said pixel elements, representing an image frame containing said image, have been switched.

10. The method of claim 9, and further comprising the step of timing said switching step so that said pixel elements of said image frame are switched in near real-time.

11. The method of claim 9, wherein said detecting step is performed with a number of color-sensitive sensors simultaneously.

12. The method of claim 9, and wherein said switching step is modified so that more than one additional pixel element is switched on at the same time to generate and number of pixel-reflected beams, and said detecting step is modified so that a sensor associated with each pixel-reflected beam detects that beam.

13. The method of claim 9, and further comprising the step of capturing a succession of image frames.

14. The method of claim 9, and further comprising the step of converting said electrical signal into a digital signal.

15. The method of claim 9, and further comprising the step of delivering said electrical signal to capacitor circuitry for generating a conventional analog image signal.

16. An image capturing system, comprising:

an optics unit for capturing an image having a means for directing image-reflected light to a spatial light modulator (SLM), a SLM comprised of an array of reflective pixel elements, which are individually addressable and switchable, such that a series of pixel-reflected light beams are reflected from said SLM as different pixels are switched, a means for focussing said pixel-reflected light to a photosensor, and a photosensor for detecting a single pixel-reflected light beam and for generating an electrical signal proportional to the intensity of said pixel-reflected light;

an analog to digital converter for converting said electrical signal to a digital signal; and a processor for performing image processing operations on said digital signal.

17. The system of claim 16, wherein said spatial light modulator is a deformable mirror device.

* * * * *